H. E. RICE.
REVERSE PHASE RELAY.
APPLICATION FILED MAY 22, 1909.
1,025,590.
Patented May 7, 1912.
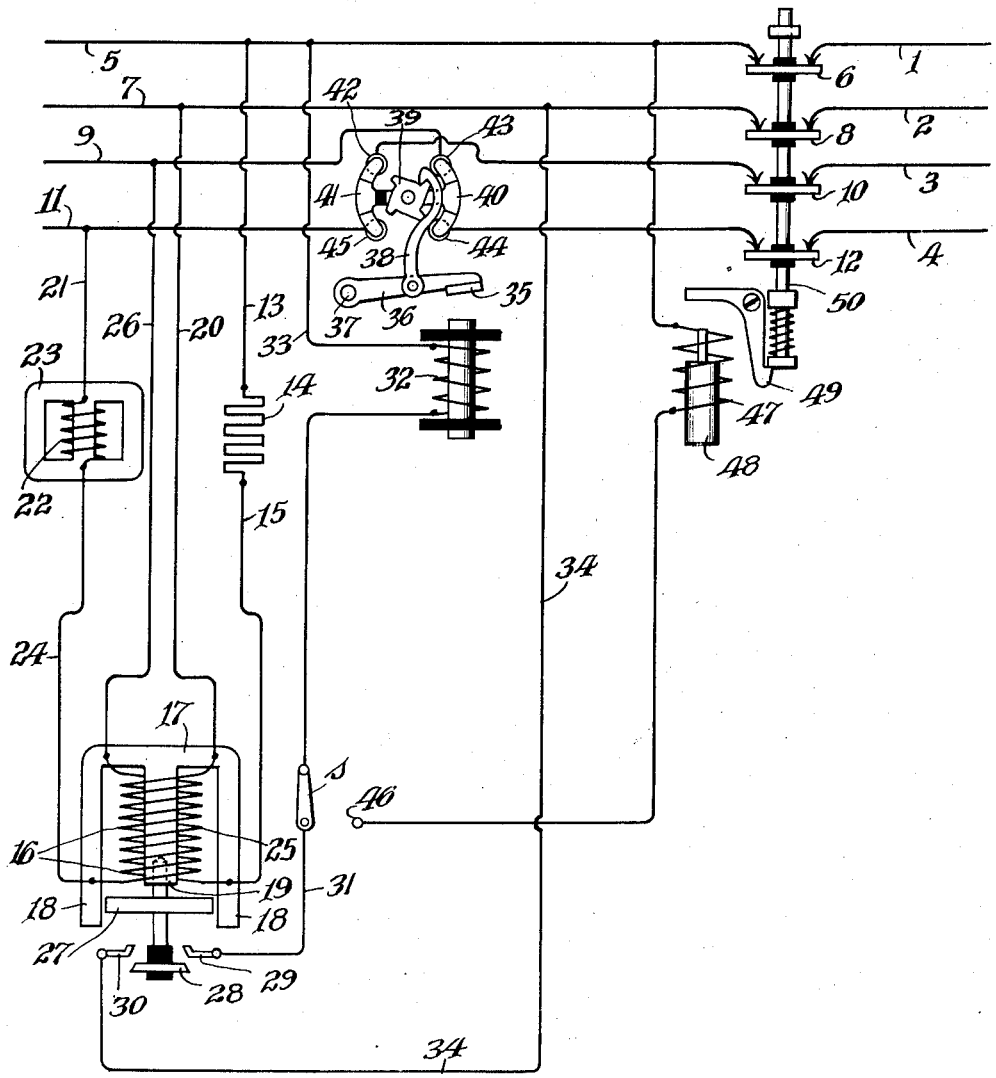

UNITED STATES PATENT OFFICE.

HORACE E. RICE, OF PHILADELPHIA, PENNSYLVANIA, ASSIGNOR TO WILLIAM C. L. EGLIN, OF PHILADELPHIA, PENNSYLVANIA.

REVERSE-PHASE RELAY.

1,025,590.     Specification of Letters Patent.     Patented May 7, 1912.

Application filed May 22, 1909. Serial No. 497,598.

*To all whom it may concern:*

Be it known that I, HORACE E. RICE, a citizen of the United States, residing in the city of Philadelphia, county of Philadelphia, and State of Pennsylvania, have invented a new and useful Reverse-Phase Relay, of which the following is a specification.

My invention relates to a relay for use in connection with polyphase alternating current circuits and resides in apparatus which is responsive to a reversal of a phase or phases of the polyphase circuit, as distinguished from a reversal of energy flow, for controlling any subsidiary circuit or apparatus, or for actuating or controlling a reversing switch which shall properly connect a phase or phases with respect to the other phase or phases of a polyphase system, or to cause an interruption of the polyphase circuit.

It is the object of my invention to provide a relay or other apparatus which shall respond when the circuit conductors of a phase or phases of a polyphase system are improperly connected such that the current of the improperly connected phase or phases is improperly related to the current in the other phase or phases, although the direction of energy flow is not reversed. To this end, I have provided apparatus hereinafter described and claimed.

For an illustration of one of the forms my invention may take, reference is to be had to the accompanying drawing which is a diagrammatic view illustrating my reverse phase relay associated with a two-phase alternating current system, and employed to reverse the connections of one of the phases or to open the circuits of both phases.

In the drawing, the conductors 1 and 2 are the supply wires or conductors of one phase of the two phase system, while the conductors 3 and 4 carry the current of the other phase, the direction of energy flow being from the right toward the left, the generator or source being assumed at the right and connected to the conductors 1, 2, 3 and 4. The conductor 1 communicates with conductor 5 through the bridging member 6 of a circuit breaker; the conductor 7 communicates with conductor 2 through bridge 8 of a circuit breaker; conductor 9 communicates with conductor 3 through the bridge 10 of a circuit breaker; and conductor 11 communicates with conductor 4 through the bridge 12 of a circuit breaker. The translating or current consuming device or devices is or are connected at the left with conductors 5, 7, 9 and 11. From the conductor 5 extends a conductor 13 which connects to one terminal of a non-inductive resistance 14 and whose other terminal connects by conductor 15 with one terminal of the winding 16 of the relay R having the core 17 with the side limbs 18, 18 and the central limb 19. The other terminal of the winding 16 connects by conductor 20 with the conductor 7. Thus, the winding 16 and the non-inductive resistance 14 are connected across conductors of one of the two phases. The conductor 21 connects to one terminal of the inductance winding 22, disposed upon a core 23, the other terminal of the winding 22 connecting by conductor 24 with one terminal of the second winding 25 of the relay R. The other terminal of the winding 25 connects by conductor 26 with conductor 9. Thus, the second relay winding 25 and the inductance 22 are connected across the conductors 9 and 11 of the other phase of the system. The relay armature 27 carries the insulated contact 28 adapted to bridge the contacts 29 and 30. From the contact 29 extends a conductor 31 which leads to a switch *s*, which, when thrown into the position shown, connects with the winding 32 of an electro-magnet whose other terminal connects by conductor 33 with the conductor 5. The other relay contact 30 connects by conductor 34 with the conductor 7. 35 is the armature of the magnet whose winding is 32, such armature being carried by the lever 36 pivoted at 37 and having pivoted thereto the hook member 38 which engages a notched member 39 carrying the segmental contacts 40 and 41, insulated from each other, and adapted to engage the contacts 42, 43, 44 and 45.

If the conductors 5 or 7 are improperly connected to the translating or consumption device, or if the conductors 9 or 11 are improperly connected to the translating or consumption device, the result is that one phase is improperly connected with respect to the other phase. When both phases are properly connected with respect to the translating or consumption device, the armature 27 of the relay R is in unattracted position. But, upon the improper connection of the conductors of either phase, the relay is energized and the bridging contacts 28 engages the relay contacts 29 and 30 allowing current to flow between conductors 5 and 7 through the conductors 31, 33 and 34, thus energizing the magnet 32 whereupon the armature 35 is attracted and the contacts 40 and 41 of the reversing switch are rotated through substantially 90 degrees, whereupon the contacts 42 and 43 are bridged by contact 41 and contacts 44 and 45 are bridged by contact 40. The result is that the conductors 9 and 11 have been interchanged with respect to the translating or consumption device; that is to say, one of the phases has been reversed in its connection. Or by throwing the switch $s$ to point 46, upon the energization of the relay R, current will flow through the coil 47 of a tripping magnet whose core 48 will then move upwardly and strike the tail of the latch 49 to release the bar 50, whereupon the bridging members 6, 8, 10 and 12 fall and the consumption circuit 5, 7, 9, 11 is disconnected from the supply circuit 1, 2, 3 and 4.

The inductance 22 causes the current in the winding 25 to lag substantially 90 degrees behind the electromotive force of that phase, while the current in the winding 16 is substantially in phase with the electro-motive force of its phase, with the result that the two windings 16 and 25 oppose each other in their magnetizing effects, so that there is substantially no or little magnetism produced when the phases of the polyphase circuit are properly inter-related. Upon the reversal of either of the phases, however, the magnetizing effects of the windings 16 and 25 are cumulative and cause a decided energization of the relay with a consequent shifting of the contacts with respect to each other. It follows, therefore, that it is characteristic of my relay that when the phases are properly inter-related the magnetization is very small or substantially nothing, that is, that the relay is deënergized; while upon the reversal of a phase the relay becomes strongly energized.

While I have shown the reverse phase relay controlling either a pole changing switch or a circuit breaker, it is to be understood that the reverse phase relay may control any desired circuit or apparatus for any purpose.

What I claim is:

1. A reverse phase relay comprising a plurality of windings and a movable member or armature controlled thereby, one of said windings connected in potential relation with the conductors of one phase of a polyphase system, another of said windings connected in potential relation with the conductors of another phase of said polyphase system, and a phase displacing device in circuit with one of said windings for causing said windings to practically neutralize each other in their effect upon said movable member or armature when the phases of said polyphase system are properly interrelated, whereby said windings operate cumulatively upon the reversal of phase to actuate said movable member or armature.

2. A reverse phase relay comprising a plurality of windings and a movable member or armature controlled thereby, one of said windings connected in potential relation with the conductors of one phase of a polyphase system, another of said windings connected in potential relation with the conductors of another phase of said polyphase system, and an inductance in circuit with one of said windings for causing said windings to practically neutralize each other in their effect upon said movable member or armature when the phases of said polyphase system are properly inter-related, whereby said windings operate cumulatively upon the reversal of phase to actuate said movable member or armature.

3. A reverse phase relay comprising a plurality of windings and a movable member or armature controlled thereby, said windings being potential windings connected across the conductors of the different phases of a polyphase system, and a phase displacing device in circuit with one of said windings, whereby said windings oppose or assist each other in their effect upon said movable member or armature depending upon the interrelation of the phases of said polyphase system.

4. A reverse phase relay comprising a plurality of windings and a movable member or armature controlled thereby, said windings being potential windings connected across the conductors of the different phases of a polyphase system, and an inductance in circuit with one of said windings, whereby said windings oppose or assist each other in their effect upon said movable member or armature depending upon the interrelation of the phases of said polyphase system.

5. A reverse phase relay comprising a plurality of windings and a movable member or armature controlled thereby, said windings being potential windings connected across the conductors of the different phases of a polyphase system, a non-inductive resistance in circuit with one of said windings, and a phase displacing device in series with another of said windings, whereby said windings oppose or assist each other in their effect upon said movable member or armature depending upon the interrelation of the phases of said polyphase system.

6. A reverse phase relay comprising two windings and a movable member or armature controlled thereby, one of said windings connected in potential relation across the conductors of one phase of a two-phase system, the other winding connected in potential relation across the conductors of another phase of said two-phase system, and a phase displacing device in circuit with one of said windings, whereby said windings oppose or assist each other in their effect upon said movable member or armature depending upon the interrelation of the phases of said two-phase system.

7. A reverse phase relay comprising two windings and a movable member or armature controlled thereby, one of said windings connected in potential relation across the conductors of one phase of a two-phase system, the other winding connected in potential relation across the conductors of another phase of said two-phase system, and an inductance in circuit with one of said windings, whereby said windings oppose or assist each other in their effect upon said movable member or armature depending upon the interrelation of the phases of said two-phase system.

8. A reverse phase relay comprising two windings and a movable member or armature controlled thereby, one of said windings connected in potential relation across the conductors of one phase of a two-phase system, the other winding connected in potential relation across the conductors of another phase of said two-phase system, a non-inductive resistance in circuit with one of said windings, and a phase displacing device in series with another of said windings, whereby said windings oppose or assist each other in their effect upon said movable member or armature depending upon the interrelation of the phases of said two-phase system.

9. The combination with a two-phase system, of an electro-magnet comprising two windings and an armature affected by said windings, one of said windings connected in potential relation across the conductors of one phase of said two-phase system, the other winding connected in potential relation across the conductors of the other phase of said two-phase system, and a phase displacing device in series with one of said windings, whereby said windings oppose or assist each other in their effect upon said movable member or armature depending upon the interrelation of the phases of said two-phase system.

10. The combination with a two-phase system, of an electro-magnet comprising two windings and an armature affected by said windings, one of said windings connected in potential relation across the conductors of one phase of said two-phase system, the other winding connected in potential relation across the conductors of the other phase of said two-phase system, a non-inductive resistance in circuit with one of said windings, and an inductance connected in series with another of said windings, whereby said windings oppose or assist each other in their effect upon said movable member or armature depending upon the interrelation of the phases of said two-phase system.

In testimony whereof I have hereunto affixed my signature in the presence of the two subscribing witnesses.

HORACE E. RICE.

Witnesses:
DANIEL WEBSTER, Jr.,
A. E. STEINBOCK.